United States Patent
Losing et al.

(10) Patent No.: US 8,050,847 B2
(45) Date of Patent: Nov. 1, 2011

(54) METHOD FOR OPERATING AN EXHAUST GAS MASS FLOW SENSOR

(75) Inventors: Karl-Heinrich Losing, Alpen (DE); Sven Nigrin, Dusseldorf (DE); Karsten Grimm, Aachen (DE); Heinrich Dismon, Gangelt (DE); Andres Tonnesmann, Neuss (DE)

(73) Assignee: Pierburg GmbH, Neuss (DE)

( * ) Notice: Subject to any disclaimer, the term of this patent is extended or adjusted under 35 U.S.C. 154(b) by 336 days.

(21) Appl. No.: 12/158,282

(22) PCT Filed: Dec. 20, 2006

(86) PCT No.: PCT/EP2006/069987
§ 371 (c)(1),
(2), (4) Date: Oct. 1, 2008

(87) PCT Pub. No.: WO2007/074122
PCT Pub. Date: Jul. 5, 2007

(65) Prior Publication Data
US 2010/0192671 A1   Aug. 5, 2010

(30) Foreign Application Priority Data
Dec. 22, 2005   (DE) .......................... 10 2005 061 548

(51) Int. Cl.
*B60T 7/12*   (2006.01)
(52) U.S. Cl. .................. 701/104; 123/434; 73/29.05
(58) Field of Classification Search .............. 701/101, 701/103, 104, 114, 115; 123/434; 73/29.05
See application file for complete search history.

(56) References Cited

U.S. PATENT DOCUMENTS

| | | | |
|---|---|---|---|
| 4,565,091 A | 1/1986 | Ito et al. | |
| 4,846,133 A | 7/1989 | Shiraishi et al. | |
| 5,255,642 A | 10/1993 | Pischke et al. | |
| 6,213,446 B1* | 4/2001 | Dismon et al. | 251/76 |
| 7,343,743 B2* | 3/2008 | Dismon et al. | 60/605.2 |
| 7,543,477 B2* | 6/2009 | Berger et al. | 73/23.33 |
| 2004/0128985 A1* | 7/2004 | Shimasaki et al. | 60/286 |
| 2004/0237646 A1* | 12/2004 | Fujita et al. | 73/335.05 |
| 2005/0188948 A1* | 9/2005 | Miura | 123/299 |
| 2005/0223698 A1* | 10/2005 | Murata et al. | 60/286 |

(Continued)

FOREIGN PATENT DOCUMENTS
DE   38 10 240 A1   3/1988
(Continued)

OTHER PUBLICATIONS

English translation of German Abstract of DE 19953718 from the European Patent Office, downloaded on May 6, 2011, 1 page, labelled as Exhibit A1.

*Primary Examiner* — John Kwon
(74) *Attorney, Agent, or Firm* — Griffin & Szipl, P.C.

(57) ABSTRACT

A method for operating an exhaust gas mass flow sensor which is used, in particular, in exhaust gas mass flows of motor vehicles has an operating mode and a cleaning mode. In an operating mode, the exhaust gas mass flow sensor is operated at an operating temperature. In a cleaning mode, the exhaust gas mass flow sensor is changed over for the purpose of cleaning a measurement region and is cleaned at a cleaning temperature which is higher than the operating temperature.

30 Claims, 1 Drawing Sheet

U.S. PATENT DOCUMENTS

2007/0158191 A1* 7/2007 Berger .................. 204/421

FOREIGN PATENT DOCUMENTS

| | | |
|---|---|---|
| DE | 40 39 599 C2 | 12/1990 |
| DE | 39 32 304 A1 | 4/1991 |
| DE | 199 53 718 A1 | 5/2001 |
| DE | 10 2005 061 550 A1 | 7/2007 |
| EP | 10 999 39 A2 | 5/2001 |
| WO | 03/095947 A1 | 11/2003 |
| WO | 2004/097392 A1 | 11/2004 |

* cited by examiner

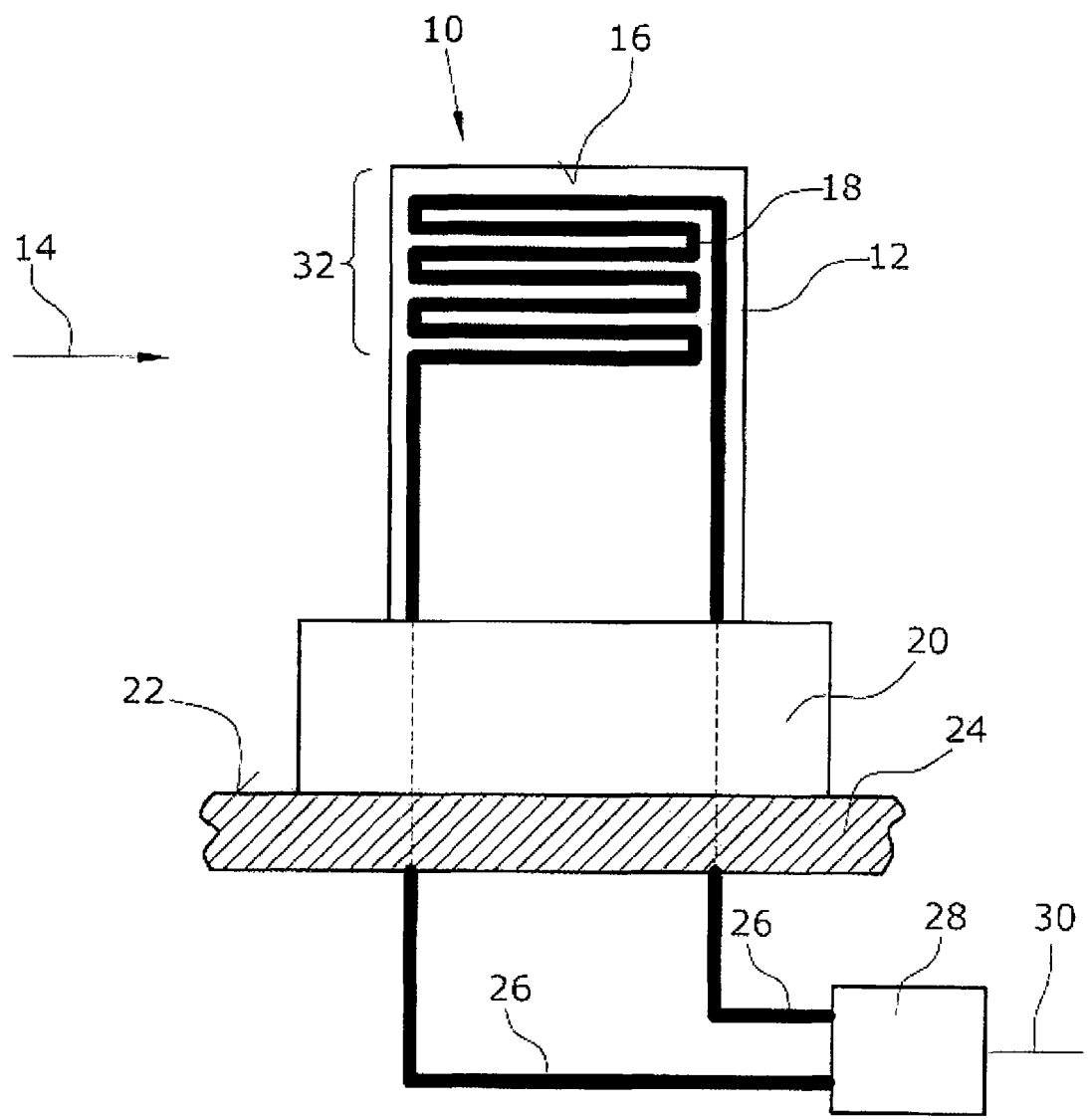

METHOD FOR OPERATING AN EXHAUST GAS MASS FLOW SENSOR

This is a National Phase Application in the United States of International Patent Application No. PCT/EP2006/069987 filed Dec. 20, 2006, which claims priority of German Patent Application No. DE 10 2005 061 548.1, filed Dec. 22, 2005. The entire disclosures of the above patent applications are hereby incorporated by reference.

FIELD OF THE INVENTION

The invention is directed to a method for operating an exhaust gas mass flow sensor. In particular, the invention is directed to a method for operating an exhaust gas mass flow sensor in exhaust gas mass flows in motor vehicles.

BACKGROUND OF THE INVENTION

Exhaust gas mass flow sensors comprise a supporting body of parallelepiped shape, for example, onto which a heating element is applied, e.g. in the form of a conductor path. Typically, a holding element is used to fasten the supporting body in an exhaust gas channel such that the short side of the supporting body is flown to by the exhaust gas mass flow and the exhaust gas mass flow flows along the long side of the supporting body. Heat transfer from the heating element to the exhaust gas mass flow takes place especially by convection. By measuring the change in temperature or by measuring the power input required to maintain the temperatures of the heating element constant, an exhaust gas mass flow can be determined using suitable algorithms. To achieve this, a temperature sensor is possibly arranged upstream of the exhaust gas mass flow sensor in the flow direction, the sensor measuring the temperature. The temperature sensor can be identical in structure to the exhaust gas mass flow sensor, the heating element here being used only to measure the temperature.

To the present day, using exhaust gas mass flow sensors in exhaust gas mass flows of motor vehicles has been possible only to a very limited extent. The reasons for this are the high temperatures occurring, as well as the particles contained in the exhaust gas flow of motor vehicles that cause deposits on the exhaust gas mass flow sensor. This leads to a corruption of the measurement results and thus to an inaccurate determination of the exhaust gas mass flow. The occurrence of condensates or of liquid droplets in the exhaust gas mass flow that contact the supporting body of the exhaust gas mass flow sensor and condense or evaporate there cause a significant corruption of the measurement results.

SUMMARY OF THE INVENTION

It is an object of the invention to provide a method for operating an exhaust gas mass flow sensor, which especially makes the exhaust gas mass flow sensor also suitable for use in exhaust gas mass flows of motor vehicles.

According to the invention, the object is achieved in accordance with a first embodiment, which pertains to a method of operating an exhaust gas mass flow sensor, in particular in exhaust gas mass flows of motor vehicles, wherein the exhaust gas mass flow sensor is operated at a working temperature in an operating mode, and the exhaust gas mass flow sensor is switched to a cleaning mode for cleaning a measuring area (32), the cleaning temperature being higher than the working temperature. In accordance with a second embodiment of the invention, the first embodiment is modified so that the exhaust gas mass flow sensor is connected to a control means (28) by which a cleaning mode is enabled in dependence on characteristics. In accordance with a third embodiment of the invention, the first embodiment or the second embodiment is further modified so that the cleaning mode is carried out in an engine start phase, especially a cold start phase of the engine.

In accordance with a fourth embodiment of the invention, the second embodiment or the third embodiment is further modified such that the heat-up time of the exhaust gas mass flow sensor, especially of the supporting body (12) of the exhaust gas mass flow sensor, is considered as included in the characteristics. In accordance with a fifth embodiment of the invention, the second embodiment, the third embodiment, and the fourth embodiment are further modified so that the composition of the exhaust gas is considered as included in the characteristics. In accordance with a sixth embodiment of the invention, the second embodiment, the third embodiment, the fourth embodiment, and the fifth embodiment are further modified so that the period of time since the last cleaning mode is considered as included in the characteristics.

In accordance with a seventh embodiment of the invention, the first embodiment, the second embodiment, the third embodiment, the fourth embodiment, and the fifth embodiment, are further modified so that the working temperature is about 100° C. higher than the fluid temperature of the exhaust gas to be measured. In accordance with an eighth embodiment of the present invention, the first embodiment, the second embodiment, the third embodiment, the fourth embodiment, the fifth embodiment, the sixth embodiment, and the seventh embodiment, are further modified so that the cleaning temperature is in the range of 450 to 600° C. In accordance with a ninth embodiment of the invention, the first embodiment, the second embodiment, the third embodiment, the fourth embodiment, the fifth embodiment, the sixth embodiment, the seventh embodiment, and the eighth embodiment, are further modified so that the cleaning mode lasts for 5 to 10 seconds.

In the present method for operating an exhaust gas mass flow sensor, the exhaust gas mass flow sensor is operated in a mode of operation at working temperature. The working temperature may vary, if the exhaust gas flow is measured by maintaining the power input of the sensor constant and by measuring the temperature variation. According to the present invention, the exhaust gas mass flow sensor can be switched to a cleaning mode for cleaning. In the cleaning mode, the exhaust gas flow sensor is heated up more, with the cleaning temperature being higher than the working temperature. This increase in temperature causes combustible deposits on the exhaust gas mass flow sensor to be burned. This guarantees that the measurement results of the exhaust gas mass flow sensor are not corrupted by deposits. Combustion is performed especially in a measurement area of the exhaust gas mass flow sensor, which measurement area is the particular area in which the conductor is provided, especially in a meandering shape, on the surface of the supporting body. By operating the exhaust gas mass flow sensor in two different modes, as provided by the invention, it is not required, in particular, to operate the exhaust gas mass flow sensor at a high temperature during conventional operation, in order to make sure in normal operation that no or only little deposits are formed. Rather, the exhaust gas mass flow sensor can be operated in the normal operational mode at an optimum temperature for measuring the exhaust gas mass flow. In particular, this has the advantage that the material of the exhaust gas mass flow sensor is subjected to less wear.

When the exhaust gas mass flow sensor is used in exhaust gas mass flows in motor vehicles, the exhaust gas mass flow sensor is subjected to fluid temperatures or exhaust gas temperatures of up to 600° C. For example, upon a cold start, as well as in dependence on the orientation or the position of the exhaust gas mass flow sensor, common fluid temperatures may range from 200 to 250° C., for example. The working temperature of the exhaust gas mass flow sensor, i.e. the temperature to which the sensor is heated for measurement, conventionally is about 100° C. higher than the fluid temperature. Especially at relatively low fluid temperatures and thus relatively low working temperatures, the deposits are burned in the cleaning mode. Generally, it has to be considered in the domain of motor vehicles that, because of the electronic components present, the ambient temperature usually ranges from −40° C. to 140° C.

Preferably, the exhaust gas mass flow sensor is connected with a control means (controller). A control means (controller) can be provided for switching between the operating mode and the cleaning mode. In particular, the control means (controller), with which the mode of the exhaust gas mass flow sensor is selected, is the control means (controller) by which the exhaust gas mass flow sensor is controlled in the operating mode. Moreover, the control means (controller) also determines the exhaust gas mass flow.

Switching from the operating mode to the cleaning mode is preferably done in dependence on characteristics (data). These may be fixed characteristics, such as a predetermined period of time, so that the cleaning mode is carried out, for example, at predetermined intervals during the operation of the vehicle. Further, time-independent characteristics (events) can be used as the characteristics (data). In particular, these may be actions such as starting the engine. Here, it is particularly preferred to carry out a cleaning mode after a cold start of the engine.

In a particularly preferred embodiment, the characteristics (data) are sensor or measurement data by which it is determined whether a cleaning of the exhaust gas mass flow sensor is required. Though separate sensors, it may be determined in this context whether deposits are present on the exhaust gas mass flow sensor. However, it is particularly preferred to give consideration to the heat-up time. Should the exhaust gas mass flow sensor show deposits, these have to be heated up, too, especially during the first heating up of the exhaust gas mass flow sensor. Thus, it is possible, to trigger a cleaning modes if the time for heating up is exceeded by a predetermined threshold value, or to take this into account when setting the time of the next cleaning mode is performed.

Further, it is possible to carry out the cleaning mode cyclically and/or under certain operating conditions (cold start). When performing the cleaning mode, the issuing of sensor signals must be avoided or it must be defined accordingly as "not valid".

Moreover, it is possible to consider the composition of the exhaust gas when determining the time of the next performance of the cleaning mode. From this, the probability of the occurrence of deposits can be determined.

When an exhaust gas mass flow sensor is operated in an exhaust gas flow of a motor vehicle, cleaning temperatures of 450 to 550° C. are preferred. Depending on the material used for the exhaust gas mass flow sensor, as well as in dependence on the type of deposit, the cleaning temperature may also range from 500 to 600° C. A cleaning mode for burning deposits preferably lasts for about 10 seconds.

Besides the particularly preferred use of the exhaust gas mass flow sensor in exhaust gas flows of motor vehicles, as provided by the invention, the method is of course also advantageous when the exhaust gas mass flow sensor is used in other areas, where there is a particular risk of deposits being formed.

In a particularly preferred embodiment, the exhaust gas mass flow sensor used comprises a supporting body of ceramics. Possibly, the supporting body comprises only ceramic parts so that a correspondingly high temperature resistance is guaranteed. Preferably, the heating element is also extremely temperature resistant and preferably comprises platinum. It is particularly preferred that the heating element is substantially made of platinum.

Particularly preferred for carrying out the method of the present invention, is the use of an exhaust gas mass flow sensor with a secondary heating element as described in the applicant's patent application of the same filing date, entitled "Exhaust gas mass flow sensor and method for operating an exhaust gas mass flow sensor". Here, the secondary heating element can be used not only to heat the exhaust gas mass flow sensor in the cleaning phase in order to guarantee a reliable cleaning of the measuring area, but the secondary heating element may also be used as a sensor for measuring temperatures, in particular for determining the time of the next cleaning mode.

BRIEF DESCRIPTION OF THE DRAWING

The accompanying drawing is a schematic side elevational view of an exhaust gas mass flow sensor for carrying out the method of the invention.

DETAILED DESCRIPTION OF THE INVENTION

An exhaust gas mass flow sensor 10 has a generally parallelepiped supporting body 12. The supporting body 12, which preferably comprises ceramics, has a width ranging from 2 to 10 mm, a height ranging from 2 to 20 mm and a depth ranging from 0.1 to 0.5 mm. In the preferred orientation of the exhaust gas mass flow sensor in the exhaust gas flow, the depth of the supporting body is the side flown to by the exhaust gas. The short side of the supporting body 12 is flown to by the exhaust gas mass flow in the direction of the arrow 14. On a surface 16 of the supporting body, a heating element 18 is provided. The heating element 18 may also be arranged within the supporting body 12.

The supporting body 12 is arranged on an inner side 22 of an exhaust gas channel 24 by means of a holding element 20.

The heating element 18 is connected to a control means (controller) 28 via lines 26. Via a line 30, the control means (controller) 28 may be connected to on-board electronics or the like. Using the control means (controller) 28, the heating element 18 is heated via the lines 26. At the same time, the temperature of the supporting body 12 is measured via the lines 26 in a measuring area 32. The control means (controller) 28 further switches between the operating mode and the cleaning mode in dependence on characteristics (data).

The invention claimed is:

1. A method for operating an exhaust gas mass flow sensor, comprising the steps of:
 (a) operating the exhaust gas mass flow sensor at a working temperature in an operating mode in an exhaust gas flow; and
 (b) switching the exhaust gas mass flow sensor to a cleaning mode, for cleaning a measuring area, wherein when in the cleaning mode the exhaust gas mass flow sensor operates at a cleaning temperature higher than the working temperature of the operating mode, and wherein a control means initiates the cleaning mode based upon predefined data by switching operation of the exhaust gas mass flow sensor from the operating mode to the cleaning mode.

2. The method of claim 1, wherein the exhaust gas mass flow sensor is operated in a motor vehicle.

3. The method of claim 1, wherein the predefined data include whether an engine is being started.

4. The method of claim 3, wherein the predefined data include whether the engine is cold.

5. The method of claim 1, wherein the predefined data include a heat-up time of the exhaust gas mass flow sensor.

6. The method of claim 1, wherein the predefined data include a heat-up time of a supporting body of the exhaust gas mass flow sensor.

7. The method of claim 1, wherein the predefined data include a composition of an exhaust gas.

8. The method of claim 1, wherein the predefined data include a period of time since the last cleaning mode.

9. The method of claim 1, wherein the working temperature is about 100° C. hotter than an exhaust gas being measured.

10. The method of claim 2, wherein the working temperature is about 100° C. hotter than an exhaust gas being measured.

11. The method of claim 1, wherein the cleaning temperature is in a range of 450 to 600° C.

12. The method of claim 10, wherein the cleaning temperature is in a range of 450 to 600° C.

13. The method of claim 1, wherein the cleaning mode lasts for 5 to 10 seconds.

14. The method of claim 12, wherein the cleaning mode lasts for 5 to 10 seconds.

15. An apparatus comprising:
   (a) an exhaust gas mass flow sensor, including a measuring area, disposed in an exhaust gas flow; and
   (b) a control means capable of initiating a cleaning mode operation at a cleaning temperature that is higher than a working temperature of the exhaust gas mass flow sensor, wherein the control means initiates the cleaning mode operation based upon at least one predefined data by switching operation of the exhaust gas mass flow sensor from the operating mode to the cleaning mode.

16. The apparatus of claim 15, wherein the predefined data include whether an engine is being operated in an engine start phase.

17. The apparatus of claim 15, wherein the predefined data include a heat up time of the exhaust gas mass flow sensor.

18. The apparatus of claim 15, additionally comprising a supporting body of the exhaust gas mass flow sensor, wherein the predefined data include a heat-up time of the supporting body.

19. The apparatus of claim 18, wherein the supporting body is ceramic.

20. The apparatus of claim 15, wherein the exhaust gas mass flow sensor further comprises a supporting body that includes the measuring area, and the measuring area is provided with a conductor disposed on a surface of the supporting body.

21. The apparatus of claim 20, wherein the supporting body is ceramic.

22. The method of claim 1, wherein the exhaust gas mass flow sensor comprises a supporting body that includes the measuring area, and the measuring area is provided with a conductor disposed on a surface of the supporting body.

23. The method of claim 22, wherein the supporting body is ceramic.

24. The method of claim 1, wherein the control means is a controller connected to the exhaust gas mass flow sensor in order to switch the exhaust gas mass flow sensor between the operating mode and the cleaning mode, and the controller also determines exhaust gas mass flow in an exhaust gas channel in which the exhaust gas mass flow sensor is disposed.

25. The method of claim 24, wherein the controller is connected to on-board electronics.

26. The apparatus of claim 15, wherein the control means is a controller connected to the exhaust gas mass flow sensor in order to switch the exhaust gas mass flow sensor between the operating mode and the cleaning mode, and the controller also determines exhaust gas mass flow in an exhaust gas channel in which the exhaust gas mass flow sensor is disposed.

27. The apparatus of claim 26, wherein the controller is connected to on-board electronics.

28. A motor vehicle comprising:
   (a) an exhaust gas channel; and
   (b) an apparatus comprising
      i. an exhaust gas mass flow sensor including a measuring area, wherein the exhaust gas mass flow sensor is disposed in the exhaust gas channel; and
      ii. a control means capable of initiating a cleaning mode operation at a cleaning temperature that is higher than a working temperature of the exhaust gas mass flow sensor, wherein the control means initiates the cleaning mode operation based upon at least one predefined data by switching operation of the exhaust gas mass flow sensor from the operating mode to the cleaning mode, wherein the control means is a controller connected to the exhaust gas mass flow sensor in order to switch the exhaust gas mass flow sensor between the operating mode and the cleaning mode, and the controller also determines exhaust gas mass flow in the exhaust gas channel in which the exhaust gas mass flow sensor is disposed.

29. The apparatus of claim 20, wherein the conductor is a heating element that is substantially made of platinum.

30. The method of claim 22, wherein the conductor is a heating element that is substantially made of platinum.

* * * * *